United States Patent [19]
Olsen et al.

[11] Patent Number: 5,509,755
[45] Date of Patent: Apr. 23, 1996

[54] SAND DUNE AND SHORE-LINE EROSION PREVENTION SYSTEM

[76] Inventors: Glenn C. Olsen, P.O. Box 1681, Bridgehampton, N.Y. 11932; Charles A. West, 205 Harbor Beach Rd., Mt. Sinai, N.Y. 11766

[21] Appl. No.: 173,604

[22] Filed: Dec. 27, 1993

[51] Int. Cl.$^6$ .................... E02B 3/12; E02B 3/06
[52] U.S. Cl. .................. 405/21; 405/15; 405/16
[58] Field of Search ............... 405/15, 21, 23, 405/25, 30, 33, 16, 31, 35

[56] References Cited

U.S. PATENT DOCUMENTS

| | | |
|---|---|---|
| 244,640 | 7/1881 | Maxson et al. . |
| 421,631 | 2/1890 | Sutherland ................... 405/30 |
| 929,728 | 8/1909 | Taylor . |
| 2,172,409 | 11/1937 | Rex . |
| 2,967,398 | 1/1961 | Smith ........................ 405/23 |
| 3,309,876 | 3/1967 | Potter ........................ 405/35 |
| 3,786,640 | 1/1974 | Turzillo . |
| 3,966,172 | 6/1976 | Garrett ....................... 405/35 |
| 4,367,977 | 1/1983 | Schaaf et al. ................. 405/25 |
| 4,465,399 | 8/1984 | Kikuzawa et al. . |
| 4,502,816 | 3/1985 | Creter et al. . |
| 4,657,433 | 4/1987 | Holmberg . |
| 4,690,585 | 9/1987 | Holmberg . |
| 4,711,598 | 12/1987 | Schaaf et al. . |
| 4,770,561 | 9/1988 | Holmberg . |
| 4,818,141 | 4/1989 | Rauch . |
| 4,889,446 | 12/1989 | Holmberg . |
| 4,913,595 | 4/1990 | Creter, Jr. et al. . |
| 4,919,567 | 4/1990 | Sample . |
| 4,966,491 | 10/1990 | Sample . |
| 5,102,257 | 4/1992 | Creter . |
| 5,104,258 | 4/1992 | Ianell . |
| 5,120,156 | 6/1992 | Rauch . |
| 5,123,780 | 6/1992 | Martinsen . |
| 5,158,395 | 10/1992 | Holmberg . |
| 5,224,794 | 7/1993 | Atkinson et al. .............. 405/21 |
| 5,238,326 | 8/1993 | Creter . |

FOREIGN PATENT DOCUMENTS

| | | |
|---|---|---|
| 449624A | 10/1991 | European Pat. Off. . |
| 63-241212 | 10/1988 | Japan . |
| 4269207 | 9/1992 | Japan . |
| 586228 | 12/1977 | U.S.S.R. . |

OTHER PUBLICATIONS

Long Island Newsday, "Castles in the Sand?", Puzzanghera, J.

*Primary Examiner*—Ramon S. Britts
*Assistant Examiner*—Frederick L. Lagman
*Attorney, Agent, or Firm*—Schweitzer Cornman & Gross

[57] ABSTRACT

The subject invention is directed to a beach-front ecosystem erosion prevention system which can be comprised of the combination of a sand ladder located at a sand dune of the beach-front ecosystem and a sand ladder reef submerged in the water of the beach-front ecosystem. The sand ladder has a curved surface facing the water, while the sand ladder reef has at least one such curved surface facing the shore-line of the beach-front ecosystem. Each of the curved surfaces of the sand ladder and/or sand ladder reef is comprised of a plurality of individual plank members arranged in an overlapping, non-touching manner so that openings between the plank members are created. The curved surfaces of the sand ladder and sand ladder reef are concave in shape and act to work with the force of the approaching wave, or retreating undertow wave. The open spaced (slotted) configuration of the plank members allows sand which is carried within the wave and/or undertow wave, to be deposited within the openings between the plank members. This sand retention and holding system maintains the sand ladder and/or sand ladder reef securely in their positions, while also performing the ultimate required task of the system of retaining sand at the sand dune and/or in the surf area between the shore-line and the main body of the water.

38 Claims, 5 Drawing Sheets

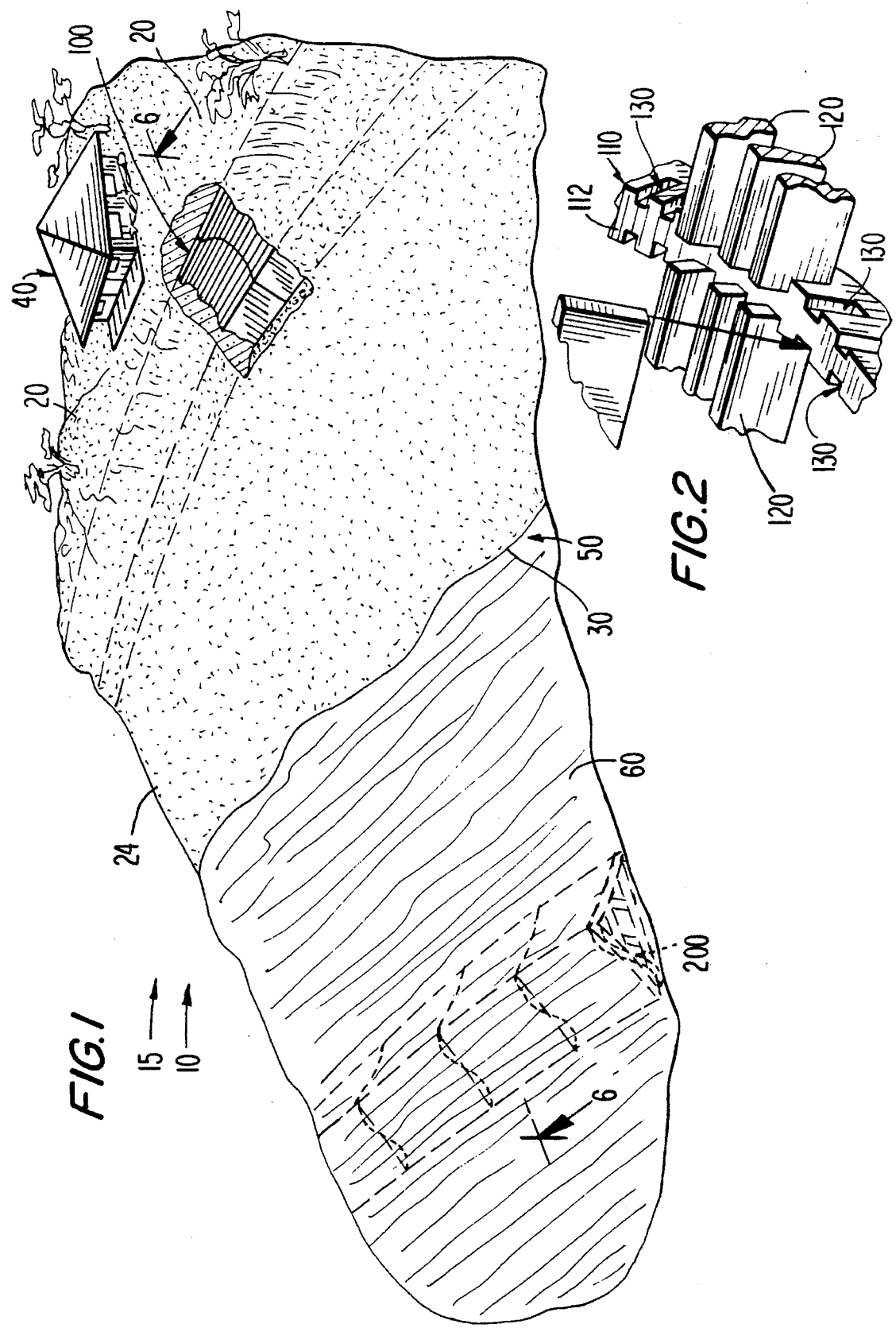

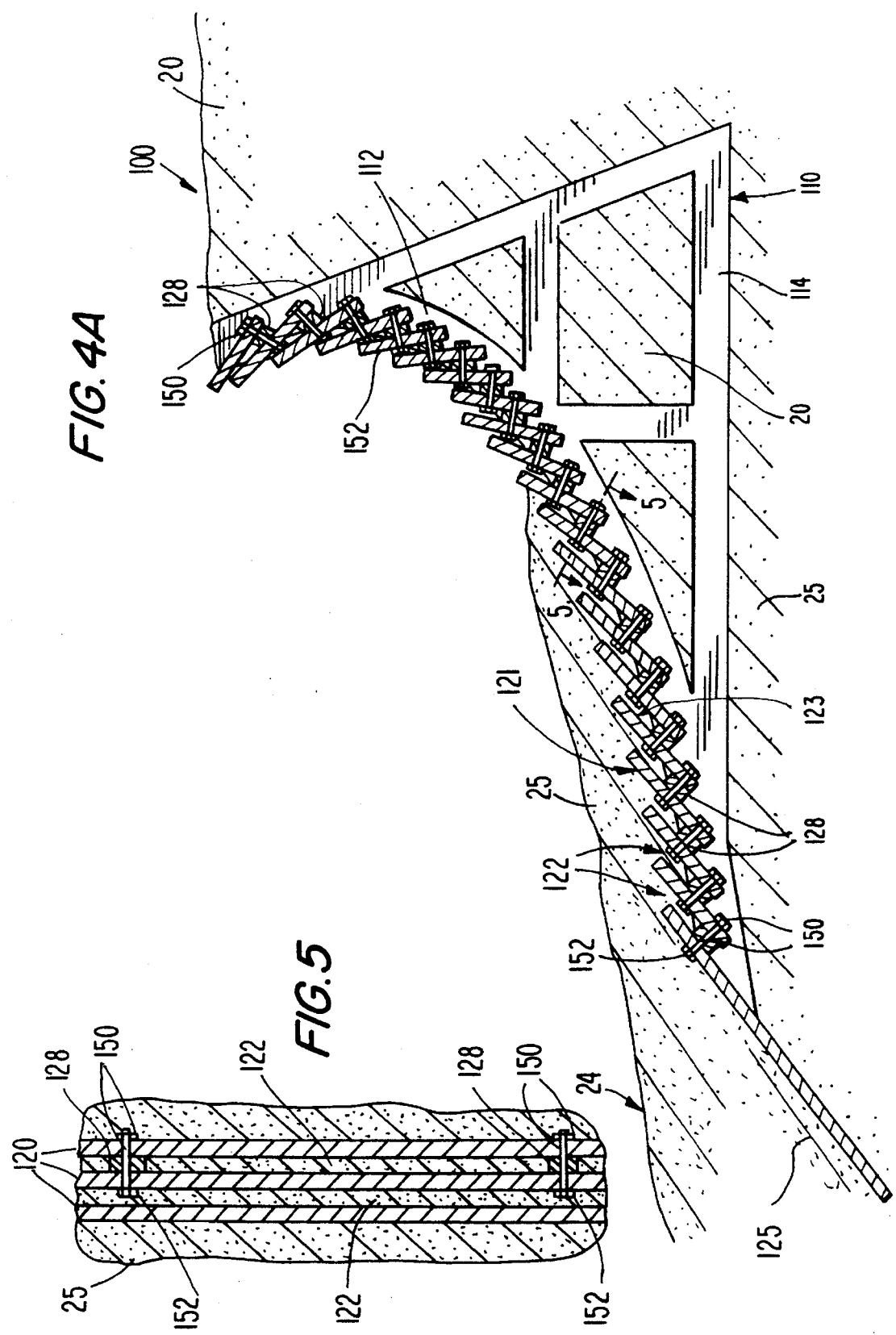

SAND DUNE AND SHORE-LINE EROSION PREVENTION SYSTEM

BACKGROUND OF THE INVENTION

This invention relates to the field of beach-front erosion prevention systems, and more particularly, to a sand dune and shore-line erosion prevention system.

The problem of beach-front, and more specifically, sand dune erosion has plagued beaches and costal regions around the world for hundreds of years. However, this natural phenomena appears to have gotten worse in recent years, especially in certain regions of the United States, due to increasingly more violent weather conditions. In order to secure beach-front ecosystems around the world, and thereby helping to minimize the damage to personal, business and governmental properties caused by severe high tides and storms, the subject invention is directed to a sand dune and shore-line erosion prevention system which will solve the problem of the deterioration and erosion of beach-fronts, and more particularly, the sand dunes and shore lines of these beach-front ecosystems.

Older existing systems in this field were bulk heads (consisting of creosote piling and wood walls, corrugated steel, CCA retaining walls or solid concrete walls with reinforced steel), rock jetties and revetments. These systems lacked longevity, and would eventually break apart, rot and/or deteriorate due to the materials used, as well as the essential physical principle behind the construction of these systems. In particular, these prior art systems were usually hardened structures erected in such a manner that all forces of the approaching waves, whether storm related or not, were directly opposed (met head-on) by the structure, instead of the structure working with the force of the wave. Additionally, these prior art structures allowed the sand from the beaches and dunes to be swept away as the waves retreated back to the sea. This sand removal left the structures exposed to all weather elements, causing erosion of the structures, which eroded material ended up being deposited onto the beaches, and eventually was swept into the sea.

Newer prior art erosion prevention systems generally related to the subject field can be seen in such U.S. patents as the patents to Ianell, U.S. Pat. No. 5,104,258, Rauch, U.S. Pat. Nos. 5,120,156 and 4,818,141, Schaaf et. al., U.S. Pat. No. 4,711,598, Creter and Creter, Jr. et. al., U.S. Pat. Nos. 5,238,326, 5,102,257, 4,913,595 and 4,502,816, and Sample, U.S. Pat. No. 4,966,491, among others. Some of these prior art systems are directed to structures which work with the force of the wave in order to dissipate the wave force, and thereby help prevent erosion of sand dunes and shore-lines. Others of these systems are reef-like structures which remain in the water in order to either collapse the wave prior to its reaching the shore-line and/or to help collect sand removed from the shore-line by the undertow force of the wave.

Although all of these prior art erosion prevention systems have their own unique benefits, none of them completely solve the problem of sand dune erosion due to high velocity storm waves, nor do any of them fully prevent the retreat of sand from a beach-front shore-line due to undertow forces. Accordingly, it would be desirable to have a system which, on the one hand, fully prevents sand dune erosion due to any type of wave force, whether storm force or normal force, and can also prevent retreat of sand back to the water due to undertow forces. It would also be desirable that such a system be constructed of materials which are ecologically undamaging to the beach-front ecosystem.

SUMMARY OF THE INVENTION

The subject invention is directed to a beach-front ecosystem erosion prevention system which can be comprised of the combination of a sand ladder located at a sand dune of the beach-front ecosystem and a sand ladder reef submerged in the water of the beach-front ecosystem. The sand ladder has a curved surface facing the water, while the sand ladder reef has at least one such curved surface facing the shore-line of the beach-front ecosystem. Each of the curved surfaces of the sand ladder and/or sand ladder reef is comprised of a plurality of individual plank members arranged in an overlapping, non-touching manner so that openings between the plank members are created.

The curved surfaces of the sand ladder and sand ladder reef are concave in shape and act to work with the force of the approaching wave, or retreating undertow wave. The open spaced (slotted) configuration of the plank members allows sand which is carried within the wave and/or undertow wave, to be deposited within the openings between the plank members. This sand retention and holding system maintains the sand ladder and/or sand ladder reef securely in their positions, while also performing the ultimate required task of the system of retaining sand at the sand dune and/or in the surf area between the shore-line and the main body of the water.

Accordingly, an object of the invention is to provide an improved sand dune and shore-line erosion prevention system.

A further object of the invention is to provide a sand dune and shore-line erosion prevention system having a sand ladder located at a sand dune of a beach-front ecosystem, which sand ladder has a curved surface to work with, and dissipate, the force of a wave.

Another object of the invention is to provide a sand dune and shore-line erosion prevention system having a sand ladder reef submerged in the water of a beach-front ecosystem between the shore-line of the system and the main body of the water, which sand ladder reef has at least one curved surface for working with, and dissipating, the force of a retreating undertow wave.

Yet another object of the invention is to provide a sand dune and shore-line erosion prevention system wherein the curved surfaces of the sand ladder and sand ladder reef are comprised of a plurality of spaced apart and overlapping plank members for the retention of sand carried by the wave and/or undertow wave.

Still a further object of the invention is to provide a sand dune and shore-line erosion prevention system wherein the sand retained within the spaced apart plank members of the sand ladder allows for the growth of sand and salt grass.

Still a further object of the invention is to provide a sand dune and shore-line erosion prevention system wherein the sand ladder reef is easily transportable and selectively placeable within the water of the beach-front ecosystem.

Yet still another object of the invention is to provide a sand dune and shore-line erosion prevention system wherein the sand ladder and/or sand ladder reef are made of materials which will not deteriorate, and will therefore not pollute the beach-front ecosystem.

Other objects of the invention will in part be obvious and will in part be apparent from the following description.

The invention accordingly comprises a system possessing the features, properties, and the relation of components which will be exemplified in the products hereinafter described, and the scope of the invention will be indicated in the claims.

BRIEF DESCRIPTION OF THE DRAWING

For a fuller understanding of the invention, reference is made to the following description taken in connection with the accompanying drawings, in which: FIG. 1 is a perspective view showing a beach-front ecosystem having a sand ladder and a sand ladder reef in accordance with the subject invention;

FIG. 2 is a perspective view of a portion of a sand ladder showing the spaced apart, overlapping configuration of the plank members;

FIG. 4A is a side elevational view of the sand ladder of the invention in its installed position;

FIG. 5 is a cross-sectional view taken along line 5—5 of FIG. 4A;

DETAILED DESCRIPTION OF THE PREFERRED EMBODIMENTS

Figures 6, 7:
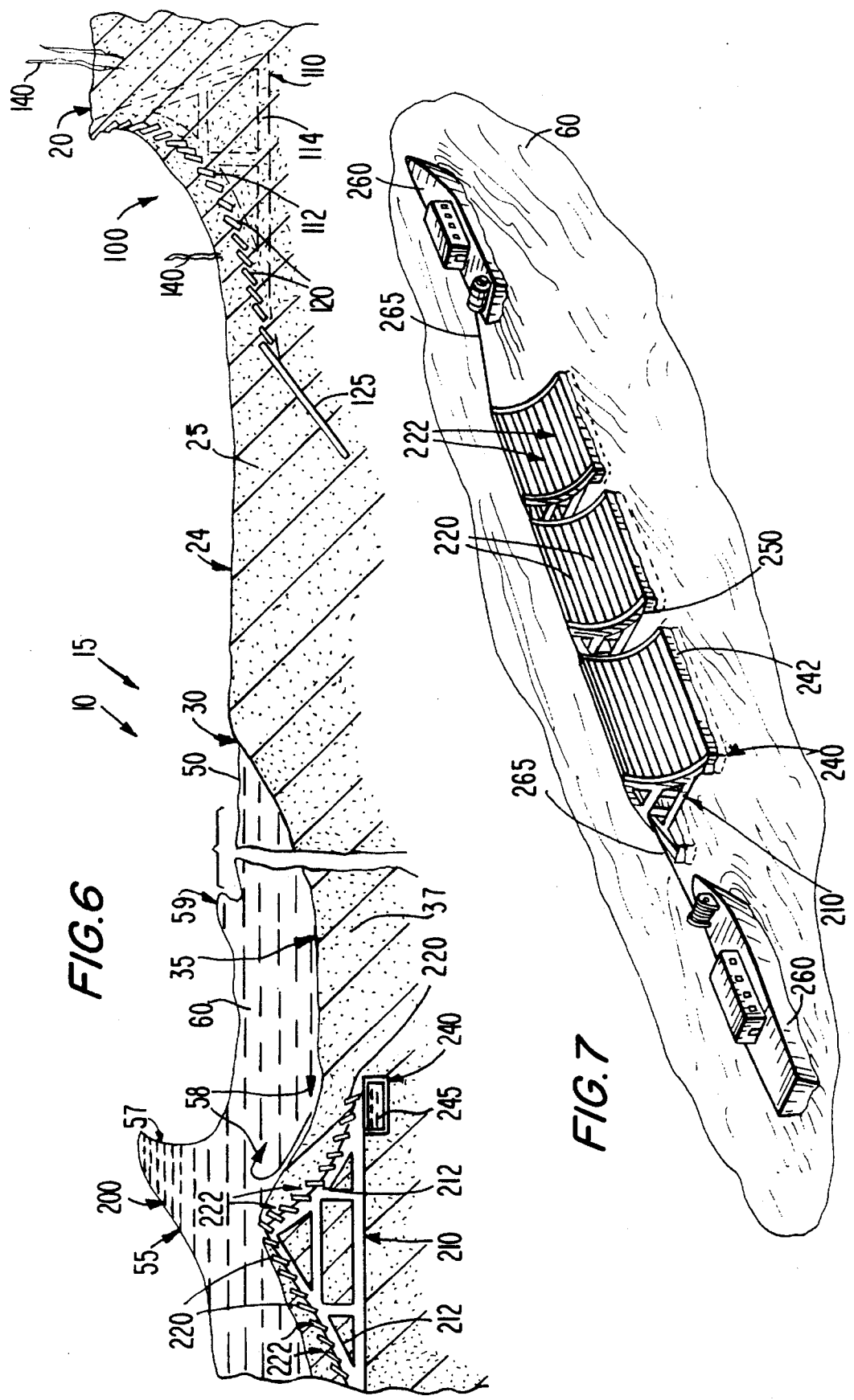
FIG. 6 is a cross-sectional view taken along line 6—6 of FIG. 1.
FIG. 7 is a perspective view showing how the sand ladder reef is selectively placed.

Referring first to FIGS. 1 and 6, a sand dune and shore-line erosion prevention system made in accordance with the invention and generally designated at 10, is illustrated. Sand dune and shore-line erosion prevention system 10 includes a sand ladder 100 and a sand ladder reef 200.

When used in combination, sand ladder 100 and sand ladder reef 200 prevent both erosion of sand dunes 20 and shore-lines 30 of a beach-front ecosystem 15. However, the combination of sand ladder 100 and sand ladder reef 200, or the existence of sand ladder reef 200, is not essential in the erosion prevention of sand dunes 20, and sand ladder 100 is not needed to prevent erosion of shore-lines 30. Sand ladder 100 can, in and of itself, prevent erosion of sand dunes 20, and sand ladder reef 200 can, in and of itself, prevent erosion of shore-lines 30. Accordingly, the combination of sand ladder 100 and sand ladder reef 200, as well as the individual sand ladder 100 and sand ladder reef 200 structures are embodied by the invention.

Continuing with FIGS. 1 and 6, beach-front ecosystem 15, in addition to including sand dunes 20 and shore-line 30, includes water 60, having waves 55, ocean floor 35, having ocean floor sand 37, and a beach 24, having sand 25. Beach-front ecosystem 15 may also have a home/business/governmental office 40 located immediately adjacent to sand dunes 20, or close to sand dunes 20. It is the close proximity of homes/businesses/government offices 40 to said sand dunes 20 which necessitates the need to prevent erosion of sand dunes 20, while it is the use of beaches worldwide which necessitates the need to prevent erosion of shore-lines 30.

The layout of a beach-front ecosystem 15 is usually as seen in FIGS. 1 and 6. Specifically, a body of water 60, usually an ocean, borders a beach 24, having a shore-line 30. Shore-line 30 is a varying point along beach 24 due to high and low tides associated with ocean 60. At low tide beach 24 may have much visible and useable sand 25, while at high tide, much of beach 24, and therefore sand 25, will be covered by water 60. A surf 50 is usually the leading edge of water 60 which contacts and washes over sand 25 of beach 24. Further up on beach 24, away from the normal high and low tides of water 60, are sand dunes 20. These sand dunes 20 are made either naturally, or by man, and act as the dividing line between recreational beach 24 and the living/working area where homes/businesses/governmental offices 40 are maintained.

Due to the normal forces of nature, water 60 will always have some form of a wave 55 which will break at some point prior to reaching shore-line 30, but whose force will carry surf 50 up onto beach 24. It is the force of wave 55 which carries surf 50 up onto beach 24 past what would be an at-rest position of water 60 at shore-line 30. Accordingly, after surf 50 goes as far as it can up beach 24 towards sand dunes 20, the natural tendency of water to seek the lowest ground creates the retreat of surf 50 towards water 60. Once in water 60, the retreating waver continues its flow further into water 60 thereby creating what has been known to be called undertow. Undertow can be seen in FIG. 6 at 58.

The above discussed wave action on a beach 24 will, under normal weather conditions, not reach sand dunes 20. and except in areas where normal wave force is extremely high (such as in certain areas of Hawaii and California), will not create appreciable loss of beach sand 25. However, during storms, whether mild or severe, high tide will be higher than normal, and the force of waves 55 on beach 24 will be greater. The reason that the damage waves 55 can do to beach 24 and sand dunes 20 is greater during a storm is due to both the increased height of waves 55 from the severe weather conditions, and the greater ability of waves 55 to keep from breaking until they are over beach 24 and possibly on top of sand dunes 20 due to the higher than normal high tides, winds and heightened size of the waves themselves. It is the force of waves 55, or of stronger surf 50, directly upon sand dunes 20 which will cause erosion of sand dunes 20. Erosion of sand dunes 20 is directly related to the removal of sand from sand dunes 20 by the force of wave 55 hitting sand dune 20, dislodging sand and carrying it back to water 60, or of surf 50 washing up on sand dune 20 and thereby removing sand back to water 60. The cause of erosion of beach sand 25 back to water 60 is mainly due to waves breaking on beach 24 and dislodging chunks of sand 25 so that they may be carried back into water 60.

It is accordingly an object of the present invention that loss of sand from sand dunes 20 and/or loss of sand 25 from beach 24 is prevented. To achieve these two distinct purposes, sand ladder 100, sand ladder reef 200 and/or the combination of the two are placed into beach-front ecosystem 15.

Turning now to FIGS. 1, 3, 4A and 6, each of sand ladder 100 and sand ladder reef 200 will be individually discussed. Turning first to a discussion of sand ladder 100 as seen in the figures, sand ladder 100 is placed at the front edge of a sand dune 20 facing beach 24 and water 60. In its preferred orientation, sand ladder 100 will become the front edge of sand dune 20, thereby supporting and retaining the water-side edge of sand dune 20 so as to maintain the integrity of the structure of sand dune 20, Turning to FIGS. 3 and 4A, sand ladder 100 has end members 110, a plurality of plank members 120 and a revetment 125. Each of end members 110 have brace members 114 supporting a curved support member 112. End members 110 are connected to each other over a certain length by top brace member 116. Each of curved support members 112 have at least one set of a plurality of notches 130 (best seen in FIG. 2), into which the plurality of plank members 120 are inserted. Once all of the plurality of plank members 120 are installed, the water facing side of sand ladder 100 will take on a concave shape (best seen in FIGS. 3 and 4A–D).

Each sand ladder 100 will have varying lengths, which will be dependent upon the specific sand dune needed to be protected. However, preferred incremental lengths of sand ladder 100 will be 10 or 20 feet. Accordingly, if the sand dune 20 needed to be protected is 100 feet in length, ten 10-foot sand ladders 100 or five 20-foot sand ladders 100 could be used.

Directing our attention more specifically to FIG. 4A, sand ladder 100 is shown in its installed position at the leading face of sand dune 20. As seen in FIG. 4A, when installed, sand ladder 100 will have its leading edge, defined by revetment 125, buried in sand 25 at the foot or toe of sand dune 20. Sand 25 will preferably cover approximately one-third to one-half of the curved surface created by the plurality of plank members 120. Accordingly, the lower plank members 120 closest to revetment 125 will be, at installation, buried under sand 25, while plank members 120 closer to the top of sand ladder 100 will be exposed to view when looking at sand ladder 100 from the direction of water 60. It is also to be noted that upon installation, top brace member 116 and the uppermost plank member 120 of sand ladder 100 will be substantially aligned with the uppermost surface of sand dune 20. In this installed orientation, the bottom of plank members 120 of the curved surface of sand ladder 100 will be up against sand dune 20 so that essentially all of sand ladder 100, including brace members 114, most of curved support member 112 and a lot of plank members 120 will be buried in sand dune 20.

FIGS. 2–4A show the preferred construction of sand ladder 100. Turning first to FIG. 2, as previously discussed, end members 110 have curved support members 112. Each of curved support members 112 has at least one set of a plurality of notches 130. Each notch of each set of the plurality of notches 130 is designed to receive a portion of an end of one plank member 120.

As is further seen in FIG. 2, one embodiment of curved support members 112 is to have two sets of plurality of notches 130, one on each side of curved support member 112. The dual-side notching of curved support member 112 enables manufacture of only one type of curved support member 112; one which is able to be used in between two adjacent sand ladders 100, or as an end of a series of sand ladders 100. In the first orientation, between two sand ladders 100, the left ends of plank members 120 would be inserted into the right-hand set of plurality of notches 130, while the right ends of plank members 120 of a second sand ladder would be installed into the plurality of notches 130 on the left hand side of curved support member 112. This construction is best seen in FIG. 2, with a broader view of two side-by-side sand ladders 100 seen in FIG. 1. Similarly, the end-most sand ladder 100 of a row of sand ladders 100, would only have one set of plurality of notches 130 on one side of curved support member 112 occupied by planks 120.

However, it is also anticipated by the invention that only one set of the plurality of notches 130 might exist. In this configuration (not shown), the one set of notches 130 might be only one of the sets shown in FIG. 2, or preferably, each notch might extend fully across curved surface 112 (not shown) so that any portion of a plank member 120 could fit into it; instead of being limited to only the end of each of planks 120 as shown in FIG. 2. This latter notch configuration would allow for longer plank members 120 being supported at varying locations by members 110; i.e., members 110 would not always having to be end members 110.

Figure 3:
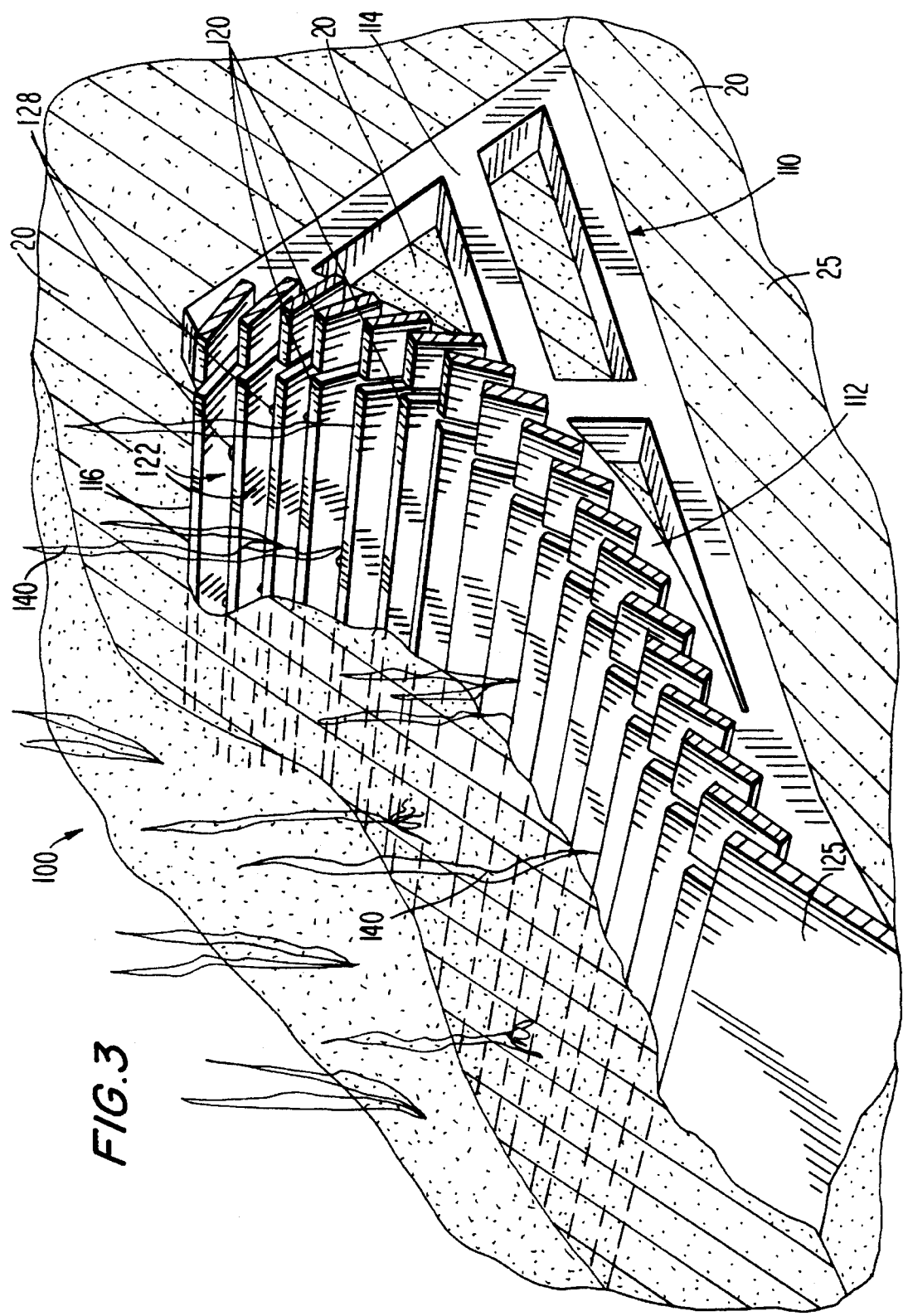
FIG. 3 is a cut-away perspective view of a sand ladder in accordance with the invention.

Once all plank members 120 are installed into their respective notches 130, plank members 120 are joined together at increments along their longitudinal length by fastening assemblies 150 and spacer blocks 128, as best seen in FIGS. 3, 4A and 5. Specifically, depending upon the frequency of wave action to reach sand ladders 100 for a particular location, varying numbers of fastening assemblies 150 and spacing blocks 128 can be used over the length of sand ladder 100.

These items are installed in accordance with FIGS. 3, 4A and 5. In particular, each spacer block 128 has a hole extending therethrough (not shown) through which a portion 152 of fastening assembly 150 will be inserted. Specifically, spacer block 128 will be placed in between two plank members 120, and fastening assembly 150 will then be inserted so that the adjacent plank members 120 are secured together.

Each plank member 120 has a first surface 121 substantially facing water 60 and a second surface 123 substantially facing sand dune 20. Each plank 120A closer to water 60 than its adjacent plank 120B will overlap its adjacent plank 120B so that first surface 121 of adjacent plank 120B is substantially overlapped by plank 120A, as best seen in FIGS. 3 and 4A. In fact, the overlap of plank 120A to plank 120B is such that when sand ladder 100 is viewed from water 60 (FIG. 3), fastening assembly 150 is not visible. For this to be accomplished, each of fastening assemblies 150 needs to be inserted through plank 120A at an approximate mid-point in the height of plank 120A, and through plank 120B at a point towards the bottom of the height of plank 120B, as best seen in FIG. 4A.

Fastening assembly 150 may be any one of a variety of known fasteners. For example, fastening assembly 150 might be a bolt and nut system, as shown in the drawings, or a pop-rivet (not shown) or a wedge-shaped fastener (not shown) having a head section which expands upon exiting the hole in plank 120B so that it cannot thereafter be withdrawn, or any other known means for fastening planks together.

Continuing with FIG. 4A, at the toe of sand ladder 100 is revetment 125. Revetment 125 is essentially a plank 120 which is larger in width so that it extends into sand 25 of beach 24. Revetment 125 acts as a front-end anchor for sand ladder 100 against possible lifting of sand ladder 100 due to water flow beneath sand ladder 100.

Turning now to a discussion of how sand ladder 100 functions to prevent erosion of a sand dune 20, as discussed above, in its installed position, sand ladder 100 becomes the leading edge closest to water 60 of sand dune 20. The curved surface created by planks 120 of sand ladder 100 is such that an opening 122 exists between each adjacent plank members 120; the size of openings 122 being dictated by the spacing of notches 130 on curved support members 112 and the size of spacer blocks 128. In operation, when water 60 reaches sand ladder 100 either as surf 50 or a breaking wave 55, water 60 will in part be absorbed through sand ladder 100 into sand dune 20 through openings 122 between blank members 120, and will in part be reflected in a curved arc back towards water 60, as best seen in FIG. 4C. It is the action of water 60 permeating through openings 122 between plank members 120 which causes sand 25 of sand dune 20 immediately below and behind sand ladder 100 to condense and densify thereby holding sand ladder 100 in place as the front surface of sand dune 20. Further, all water 60 which reaches sand ladder 100 is a suspension of water and sand 25 picked up from beach 24. Accordingly, when water 60 washes over, or breaks over sand ladder 100, not only does water 60 permeate through openings 122 of sand ladder 100, but the suspended sand particles in water 60 also permeates through openings 122. This continued replenishing of sand 25 between plank members 120 prevents the total removal of sand from sand dune 20 either through or under sand ladder 100.

Figure 4B:
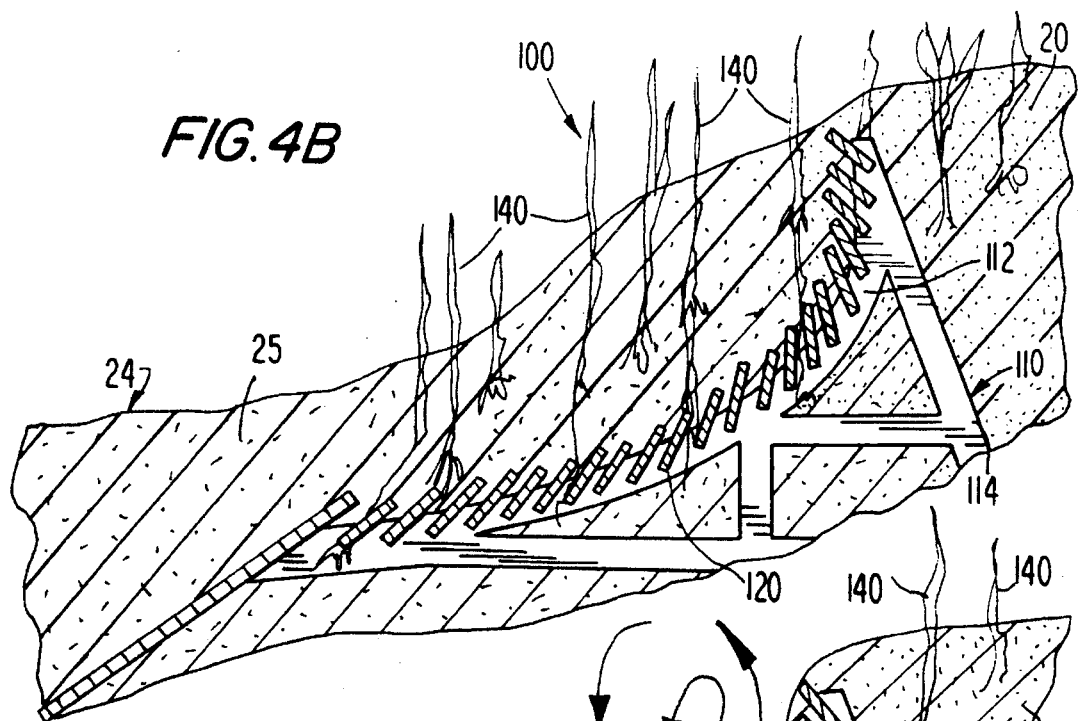
FIG. 4B is a side elevational view of the sand ladder of FIG. 4A after sand has been allowed to build up over the sand ladder.
Figure 4C:
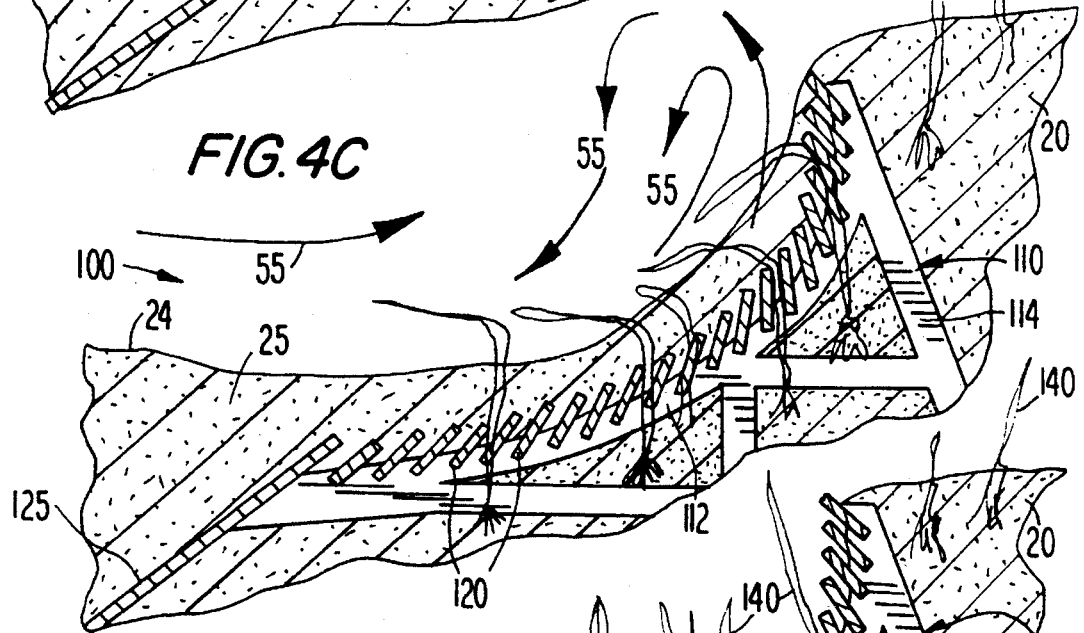
FIG. 4C is a side elevational view of the sand ladder of FIG. 4A showing storm wave forces working on the sand ladder.
Figure 4D:
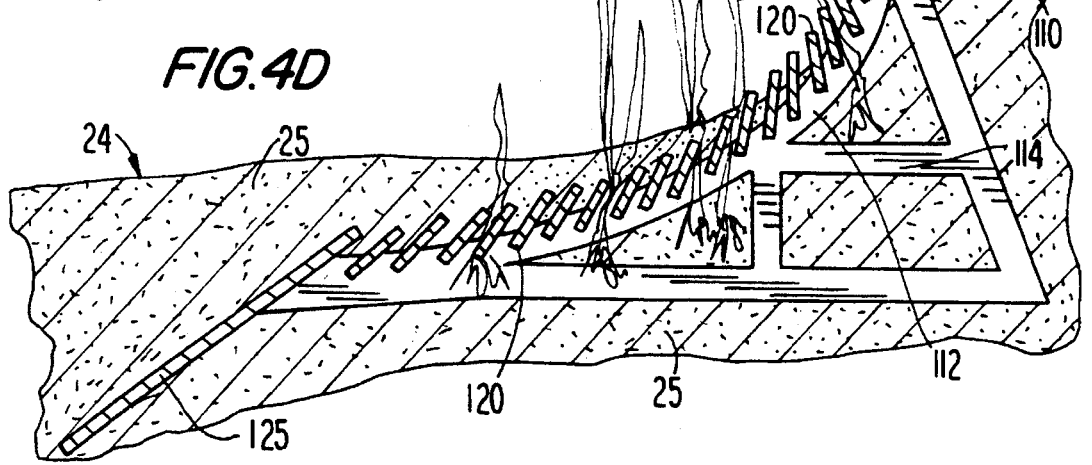
FIG. 4D is a side elevational view of the sand ladder of FIG. 4A showing the sand ladder after the storm of FIG. 4C is over.

For a better understanding of how sand ladder 100 will look during different stages of its placement at sand dune 20, attention is directed to FIGS. 4A–4D. As previously discussed, FIG. 4A is a cross-section through sand ladder 100 in its installed position, showing revetment 125 buried below beach 24, with sand 25 extending a third to one-half of the way up the curved surface of sand ladder 100. FIG. 4B shows a preferred cross-section through a sand ladder 100 which has been essentially buried below sand 25 due to wind continually depositing sand 25 over sand ladder 100. FIG. 4C shows a typical surf 50 from a storm hitting sand ladder 100. FIG. 4C shows how wave 55 is thrown back upon itself due to the curved nature of the front surface of sand ladder 100. This redirection of wave 55 causes it to crash back down upon the lower portion of sand ladder 100, thereby depositing more of the particulate sand matter located within wave 55 onto the lower portions of sand ladder 100. Although as seen in FIG. 4D, sand 25 is no longer piled on top of sand ladder 100, as was previously seen in FIG. 4B, sand 25 does still remain over the lower portions of sand ladder 100. Accordingly, FIG. 4D essentially mimics FIG. 4A in appearance. The above progression through the life of sand ladder 100 shows that even after a severe storm, it will, at a minimum, maintain the integrity and positioning it had when it was initially installed.

Continuing with FIGS. 3–4D, sand and/or salt grass 140 is seen to be growing over and through sand ladder 100. Sand/salt grass 140 is naturally occurring grass which grows in sand. It is important to have sand/salt grass 140 in a beach-front ecosystem since this grass tends to secure placement of sand 25 of sand dunes 20, and to also contribute to the natural/rustic look of the beach-front ecosystem. Accordingly, the ability of sand/salt grass 140 to grow in, over and through openings 122 of sand ladder 100, further creates stability and retention of sand 25 of sand dune 20, as well as the expected aesthetic appeal of a natural sand dune 20.

Turning back now to FIG. 6, sand ladder reef 200 is shown as preferably placed in beach-front ecosystem 15. In its preferred placement, sand ladder reef 200 will be totally submerged within water 60, such that the height of water 60 above the top of sand ladder reef 200 during normal weather conditions will be approximately ten feet at low tide. Accordingly, as will be discussed below, proper placement of sand ladder reef 200 will be a prolonged procedure most probably associated at least two different placements of the reef.

Continuing with FIG. 6, it is seen that sand ladder reef 200 has a substantially triangular shape, wherein the side facing shore-line 30 is concave when viewed from shore-line 30, and the side facing away from shore-line 30 and towards the main body of water 60 is both concave and convex. The sand ladder reef divides the body of water in which it is submerged into first and second portions, the first portion being that portion located between the said ladder reef and the shore line.

In order to achieve this configuration, sand ladder reef 200 is constructed substantially identically to how sand ladder 100 is constructed. Specifically, each curved surface of sand ladder reef 200 is comprised of a plurality of overlapping, spaced apart plank members 220. Plank members 220 are supported at their ends on curved support members 212, each of curved support members 212 has at least one set of a plurality of notches for receipt of the ends of each plank member 220. Plank members 220 are secured to each other through the same use of spacer blocks and fastening assemblies (not shown), as was previously discussed for sand ladder 100. Sand ladder reef 200 also has a bracing system 210 as shown in FIG. 6.

Discussing in more detail the nature of the curved surfaces of sand ladder reef 200, as was previously stated, the curved surface facing shore-line 30 of sand ladder reef 200 is concave in shape. This surface is concave in shape for the same reason that the curved surface of sand ladder 100 is concave in shape, to redirect wave forces back upon themselves so as to deposit sand particles suspended in the wave. Specifically, as seen in FIG. 6, an undertow wave, seen as arrow 58, is shown directed upward along the concave curved surface of sand ladder reef 200. As shown, undertow wave 58 will travel to the apex of the concave surface and break upon itself thereby depositing sand 37 over sand ladder reef 200. It is this redirection of undertow wave 58 which causes sand ladder reef 200 to help maintain its integrity and prevent erosion of beach 24.

The concave curved surface facing shore-line 30 of sand ladder reef 200 does not act alone in its prevention of erosion of beach 24 and/or erosion of sand dunes 20, but acts together with the second curved surface, which faces the main body of water 60. The second curved surface is shaped in order to substantially mimic the shape of ocean floor 35 and shore-line 30 (also shown in FIG. 6). Specifically, it is seen that ocean floor 35 immediately in front of shore-line 30 is substantially concave in shape, but that at shore-line 30 the surface becomes convex. The purpose of this concave/convex second curved surface of sand ladder reef 200, is to cause wave 55 to prematurely break as it passes over sand ladder reef 200, thereby releasing some of the energy of the force of wave 55.

Continuing with FIG. 6, wave 55 releases energy at 57 and becomes a reduced wave 59 in between sand ladder reef 200 and shore-line 30. It is the reduction of wave 55 to reduced wave 59 which helps to prevent the intense "slapping" of waves upon beach 24, which "slapping" loosens sand 25 from beach 24 and carries it into water 60. It is also the reduction in size of wave 55 to reduced wave 59 which prevents many waves from reaching sand dune 20. Therefore, sand ladder reef 200, whether working by itself, or in combination with sand ladder 100, will help reduce erosion of said dunes 20 and shore-lines 30.

Turning now to FIGS. 6 and 7, sand ladder reef 200 is seen to have positioning members 240. Positioning members 240 are located directly under the outermost edges of the first and second curved surfaces of sand ladder reef 200. Positioning members 240 are essentially pontoons which are selectively fillable with air to allow floatation of sand ladder reef 200, and therefore, towing of sand ladder reef 200 to its desired position.

As seen in FIG. 7, three sand ladder reefs 200 are secured to boats 260 by a towline 265. Sand ladder reefs 200, when positioned in their final location submerged in water 60 will be abutting, but are separated when being towed, as best seen in FIG. 7 as towing space 250, so as to make towing easier. During the towing process, positioning members 240 are filled with air 242 so that sand ladder reefs 200 will float on the surface of water 60. Once in place over the position where it is believed sand ladder reefs 200 will ultimately stay at rest, water 245 (FIG. 6) is allowed to force air 242 out of positioning members 240, so that sand ladder reefs 200 sink to the bottom of water 60. As discussed, sand ladder reef 200 can be repositioned any number of times by the simple procedure of refilling positioning members 240 with air, thereby causing sand ladder reef 200 to be moveable and hence selectively repositionable for proper placement.

As discussed with respect to sand ladder 100, sand ladder reef 200 has overlapping, spaced apart plank members 220 which allow for the retention of sand through openings 222 between plank members 220 in order to continually replenish the sand below sand ladder reef 200. It is the replenishment of this sand which helps to secure sand ladder reef 200 in its position, as well as which prevents loss of sand 37 beyond sand ladder reef 200 into the main body of water 60.

It will thus be seen that the objects set forth above, among those made apparent from the preceding description, are efficiently attained, and since certain changes may be made in above constructions without the departing from the spirit and scope of the invention, it is intended that all matters contained in the above description and shown on the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed

1. For a beach-front ecosystem comprising a sand dune, water and a shore-line between said sand dune and said water, an erosion prevention system, comprising:
    a sand ladder positioned proximate said sand dune having a curved surface facing said water; and
    a sand ladder reef submerged in said water having at least one curved surface, wherein the positioning of said sand ladder reef in said water creates first and second portions of said water, said first portion of said water closer to said sand ladder, wherein the force of a wave from said second portion of said water will be diminished by said sand ladder reef thereby dissipating said force of said wave against said sand ladder.

2. An erosion prevention system as recited in claim 1, said curved surface of said sand ladder being concave when viewed from said water.

3. An erosion prevention system as recited in claim 1, said curved surface of said sand ladder comprising a plurality of plank members.

4. An erosion prevention system as recited in claim 3, wherein each plank member of said plurality of plank members are separated from an adjacent plank member of said plurality of plank members, said separation defining an opening between said adjacent plank members.

5. An erosion prevention system as recited in claim 4, wherein said adjacent plank members are secured together in a substantially overlapping orientation by fastening means.

6. An erosion prevention system as recited in claim 4, wherein each plank member of said plurality of plank members have first and second surfaces, said first surface substantially facing said water and said second surface substantially facing said sand dune.

7. An erosion prevention system as recited in claim 6, wherein said separation of said adjacent plank members is between said first surface of one of said plank members and said second surface of another of said plank members.

8. An erosion prevent system as recited in claim 3, said sand ladder further having first, second and third dimensions, said first dimension defining a length of said sand ladder along said sand dune, said second dimension defining a width of said sand ladder between said water and said sand dune and said third dimension defining a height of said sand ladder.

9. An erosion prevention system as recited in claim 8, wherein said third of said sand ladder is substantially equal to said height of said sand dune.

10. An erosion prevention system as recited in claim 8, said sand ladder further having supporting members substantially defining said second and third dimensions.

11. An erosion prevention system as recited in claim 10, said supporting members each having a curved surface.

12. An erosion prevention system as recited in claim 11, wherein said curved surface of each of said supporting members is substantially identical to said curved surface of said sand ladder.

13. An erosion prevention system as recited in claim 11, wherein each of said supporting members has at least one set of a plurality of notches along said curved surface, each notch of said at least one set of said plurality of notches for receiving one of said plurality of plank members.

14. An erosion prevention system as recited in claim 3, wherein one of said plurality of plank members closest to said water is larger than any other of said plurality of plank members and extends into sand located at a toe of said sand ladder.

15. An erosion prevention system as recited in claim 1, said at least one curved surface of said sand ladder reef facing said shore-line.

16. An erosion prevention system as recited in claim 15, said at least one curved surface of said sand ladder reef being concave when viewed from said shore-line.

17. An erosion prevention system as recited in claim 16, said sand ladder reef further having a second curved surface angularly displaced from said at least one curved surface.

18. An erosion prevention system as recited in claim 17, wherein a first portion of said second curved surface of said sand ladder reef is concave when viewed from said second portion of said water, and a second portion of said sand ladder reef is convex when viewed from said second portion of said water.

19. An erosion prevention system as recited in claim 18, wherein said first concave portion of said second curved surface of said sand ladder reef is below said second convex portion of said second curved surface of said sand ladder reef, thereby substantially creating a preliminary shore-line at said sand ladder reef at which said wave can break, diminishing said force.

20. An erosion prevention system as recited in claim 16, said at least one curved surface of said sand ladder reef comprising a plurality of plank members.

21. An erosion prevention system as recited in claim 20, wherein each plank member of said plurality of plank members are separated from an adjacent plank member of said plurality of plank members, said separation defining an opening between said adjacent plank members.

22. An erosion prevention system as recited in claim 21, wherein said adjacent plank members are secured together with in a substantially overlapping orientation by fastening means.

23. An erosion prevention system as recited in claim 1, wherein each plank member of said plurality of plank members of said at least one curved surface of said sand ladder reef have first and second surfaces, said first surface substantially facing said shore-line and said second surface substantially facing said second portion of said water.

24. An erosion prevention system as recited in claim 21, wherein said separation of said adjacent plank members is between said first surface of one of said plank members and said second surface of another of said plank members.

25. An erosion prevention system as recited in claim 19, said second curved surface of said sand ladder reef comprising a plurality of plank members.

26. An erosion prevention system as recited in claim 25, wherein each plank member of said plurality of plank members of said second curved surface of said sand ladder reef has first and second surfaces, said first surface substantially facing said second portion of said water, and said second surface substantially facing said shore-line.

27. An erosion prevention system as recited in claim 26, wherein each plank member of said plurality of plank members are separated from an adjacent plank member of said plurality plank members, said separation defining an opening between said adjacent plank members.

28. An erosion prevention system as recited in claim 27, wherein said separation of said adjacent plank members is between said first surface of one of said plank members and said second surface of another of said plank members.

29. An erosion prevention system as recited in claim 1, said erosion prevention system further comprising positioning means for selectively positioning said sand ladder reef in said water.

30. An erosion prevention system as recited in claim 29, said positioning means comprising at least one positioning member located below said at least one curved surface of said sand ladder reef.

31. An erosion prevention system as recited in claim 30, wherein said at least one positioning member is selectively inflatable.

32. An erosion prevention system as recited in claim 31, wherein said at least one positioning member is a pair of positioning members.

33. A sand dune erosion prevention system for placement at a sand dune of a beach-front ecosystem comprising:

a sand ladder having a plurality of plank members defining a curved surface; and at least two supporting members for supporting said plurality of plank members in such a way that adjacent plank members of said plurality of plank members are separated, thereby defining a plurality of openings in said curved surface.

34. A sand dune erosion prevention system as recited in claim 33, wherein each of said at least two supporting members have at least one set of a plurality of notches for receiving said plurality of plank members.

35. A sand dune erosion prevention system as recited in claim 34, wherein each plank member of said plurality of plank members has a first surface facing a body of water of said beach-front ecosystem and a second surface facing said sand dune.

36. A sand dune erosion prevention system as recited in claim 35, wherein each of said plurality of openings are defined between said first surface of one of said plurality of plank members and said second surface of another of said plurality of plank members.

37. A sand dune erosion prevention system as recited in claim 33, wherein each plank member of said plurality of plank members is adjacent to and substantially overlapping another of said plank members of said plurality of plank members.

38. A sand dune erosion prevention system as recited in claim 37, wherein said overlapping plank members are secured to each other by fastening means.

* * * * *